Jan. 8, 1957    A. J. HAMLIN    2,776,581
SPEED CONTROL DEVICES
Filed Nov. 12, 1952
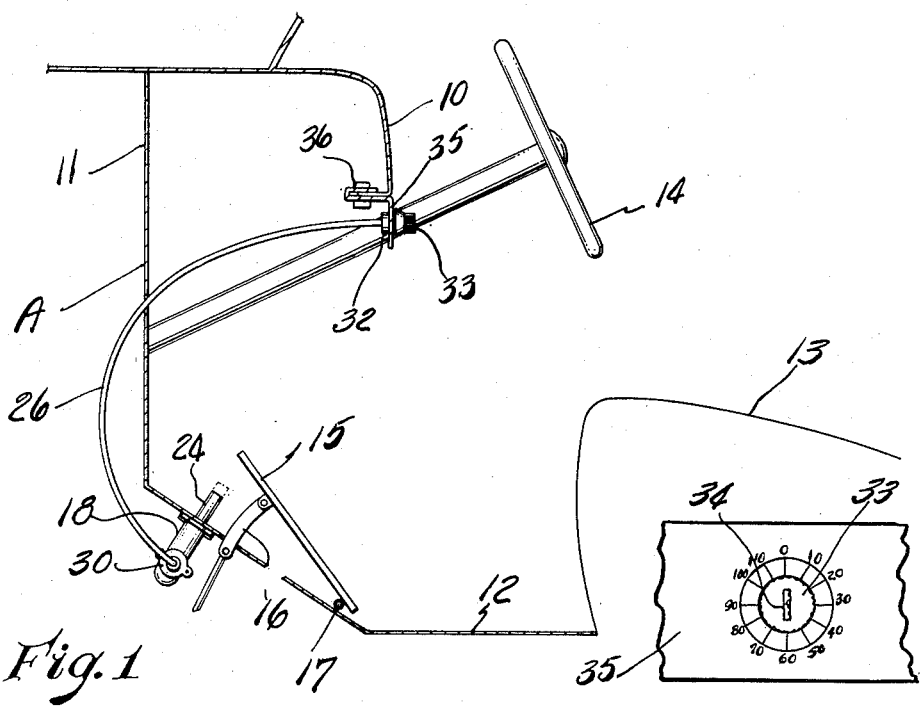
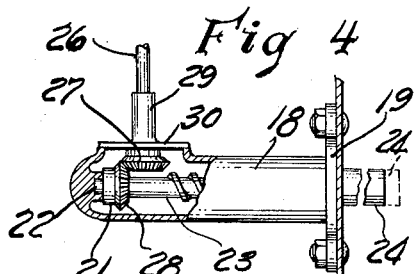
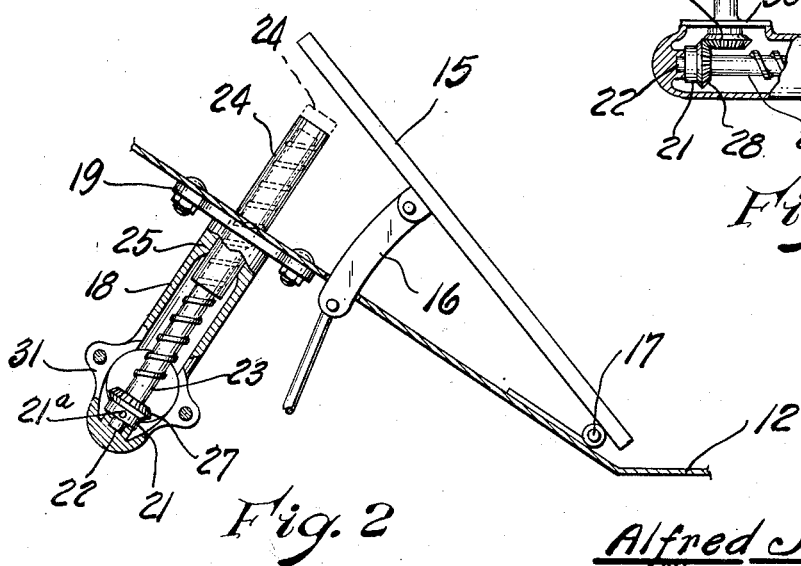
INVENTOR.
Alfred J. Hamlin
BY
Learmant Learman.
ATTORNEYS

United States Patent Office 2,776,581
Patented Jan. 8, 1957

2,776,581

SPEED CONTROL DEVICES

Alfred J. Hamlin, Saginaw, Mich.

Application November 12, 1952, Serial No. 319,890

5 Claims. (Cl. 74—526)

This invention relates to speed control devices and more particularly to a selective speed control device which can be adjusted or set to govern the maximum speeds at which motor vehicles can be driven.

As is well known, the accident rate among drivers under the age of twenty-one is relatively high with respect to the accident incidence for drivers of all ages. In a great many cases, accidents are the direct result of traveling at an excessive rate of speed. In many instances, it is therefore highly desirable for the parent of the minor driver to be able to control the maximum rate of speed at which his car can be driven. Others, also, notably the employer who employs drivers to drive vehicles of various kinds and for whose negligence he is generally legally responsible, are very desirous of governing the rate of speed at which their vehicles are driven.

One of the prime objects of the invention is to design a speed control device which is positive in operation, being disposed beneath the accelerator to permit its depression beyond a predetermined point.

Another object of the invention is to design a speed control device in which the working parts are enclosed and cannot be tampered with to change the setting once the device is locked.

A further object of the invention is to design a speed control device which can be inexpensively manufactured and installed in all vehicles employing conventional accelerators, and which is rugged and durable in construction and reliable and effective in operation.

A still further object of the invention is to provide a speed control device, the locking mechanism of which is disposed on the dashboard within easy reach, and which thus does not require that the hood be lifted to lock the device at a given setting or that a mechanic's services be employed.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of the invention installed in a motor vehicle which is only diagrammatically indicated.

Fig. 2 is a fragmentary, enlarged, part sectional, side elevational view thereof.

Fig. 3 is a fragmentary, enlarged, part sectional, transverse view thereof.

Fig. 4 is a fragmentary, front elevational view of the lock mounted on the dashboard.

Referring now more particularly to the accompanying drawing wherein I have shown the preferred embodiment of my invention, a letter A generally indicates a conventional motor vehicle which includes a dashboard 10, a cowl bulkhead 11, a floorboard 12, a passenger seat 13, a steering wheel 14, and an accelerator pedal 15 including linkage 16 leading to the throttle lever of the carburetor (not shown).

The accelerator pedal 15 is hingedly mounted as at 17 on the floorboard 12 and adapted to be foot-actuated in the usual manner to increase the speed of the vehicle. The speed control device includes a substantially cylindrical housing 18 which is formed with a base flange 19 so that the housing 18 which is preferably disposed normally with relation to the floorboard 12 can be bolted to the under face of the floorboard 12 beneath the accelerator as at 20.

Mounted in the lower end of the housing 18 is a thrust bearing 21 pinned to the housing as at 21$^a$ which journals the reduced end 22 of a threaded shaft 23. Threaded on the opposite end of the shaft 23 is a sleeve 24 of square cross-section which is slidingly supported in the enlarged upper end wall portion 25 of the housing 18 and which extends up through a suitable square opening (not shown) in the floorboard 12 into the path of travel of the accelerator pedal 15.

The shaft 23 is actuated by a flexible cable 26 leading from a locking and setting mechanism on the dashboard 10 which will be presently described, a bevel gear 27 on the end of the cable 26 meshing with a bevel gear 28 on the shaft 23 adjacent the bearing 21. To support this end of the cable, a bearing sleeve 29 is provided on a plate 30 which is bolted to a flatted portion 31 of the housing 18. The opposite end of the cable 26 leads into a dial housing 32, and is rigidly secured to the centrally disposed dial 33 which revolves relative to the circumferentially spaced speed graduations which are provided on the outer face of the housing 32.

A keyhole 34 is shown in the dial 33 leading into a lock mechanism (not shown) in the housing 32, which prevents the rotation of the dial 33 relative to the housing 32, except when the key (not shown) is inserted and turned. This latter action can be accomplished in any known and suitable manner, as by the locking mechanism releasing a spring-pressed latch or tumbler which engages with the stationary housing 32. The housing 32 is conveniently supported on the dashboard 10 by a depending substantially L-shaped bracket 35 which is bolted to the inwardly turned edge of the dashboard 10 as at 36.

To set the device, a key (not shown) is inserted in the keyhole 34 and turned, thus freeing the dial 33 which can then be set at the desired maximum speed beyond which the vehicle is not to travel. The twirling of the dial 33 revolves the cable 26, which drives the shaft 23 through the gears 27 and 28 and moves the sleeve 24 axially. The pitch of the threads on the shaft 23 and sleeve 24 is relatively large so that a relatively slight manipulation of the dial 33 will move the sleeve 23 the requisite distance.

To install the device in any automobile, is a very simple matter, it being only necessary to bore an opening through the floorboard 12 for the sleeve 24 and an opening in the bulkhead 11 for the cable 26, and thence to bolt the housing 18 and dial housing 32 in their respective positions.

From the foregoing description, it will be obvious that I have perfected a very simple, substantial and practical speed control means which can be set to control the top speed at which the vehicle can be driven.

What I claim is:

1. In combination with the accelerator of a motor vehicle and the floorboard thereof, a selective speed control to positively limit the depression of the accelerator comprising a housing secured on the floorboard of the vehicle, a relatively rotatable and axially movable shaft and sleeve means journaled in said housing, one of said shaft and sleeve being fixed against rotation and the other against axial displacement, a dial housing having graduations thereon, a dial in said dial housing associated with said graduations, means connecting said dial and shaft and sleeve means to transmit movement of said dial as it is twirled to register with said graduations to said shaft and sleeve means, mating threads of large pitch on said shaft and sleeve means relative to the diameters of the shaft and sleeve so that relative axial displacement thereof is large in proportion to relative rotation thereof, said axially movable member of the shaft and sleeve means extending through said housing under the accelerator and blocking the depression thereof in accordance with the position of said dial.

2. In combination with the accelerator of a motor vehicle and the floorboard thereof, the floorboard having an opening therethrough under the accelerator, a selective speed control device adapted to positively limit the depression of the accelerator comprising, a housing secured under the floorboard of the vehicle, a threaded shaft journaled in said housing and disposed substantially perpendicular to the accelerator, said shaft being fixed against axial movement in said housing, a sleeve fixed against rotation threaded on the upper end of said shaft and extending up through the opening in said floorboard into the path of said accelerator, a rotatable, flexible cable geared to said shaft for actuating said shaft and axially moving said sleeve into the path of said accelerator to limit the depression of said accelerator and prevent the automobile from traveling beyond a predetermined speed, a dial housing having graduations thereon representing miles per hour, and a lockable dial in said housing associated with said graduations and connected to the end of said cable to rotate the same as it is twirled to register with one of said graduations.

3. The combination defined in claim 2 in which said sleeve is square in cross-section and said opening in said floorboard is square.

4. In combination with the accelerator of a motor vehicle and the floorboard thereof, the floorboard having an opening therethrough under the accelerator, a selective speed control adapted to limit the supply of fuel mixture delivered to the automobile engine comprising a housing secured to the floorboard of the vehicle under said opening, an axially fixed shaft having external threads of large pitch relative to the diameter thereof journaled in said housing and disposed substantially perpendicular to the accelerator, a sleeve on said shaft having mating threads of relatively large pitch so that axial displacement of said sleeve is large in proportion to rotation of said shaft, said sleeve extending through said housing and opening in said floorboard into the path of the accelerator to positively limit the depression thereof beyond a predetermined point, a flexible cable geared to said shaft to actuate said shaft and move said sleeve axially a predetermined distance into the path of said accelerator, a dial housing having graduations thereon representing miles per hour, and a lockable dial in said housing associated with said graduations and connected to the end of said cable to revolve said cable as it is twirled to register with one of said graduations.

5. In combination with the accelerator of a motor vehicle and the floorboard thereof, a selective speed control to limit the depression of the accelerator comprising, support means secured on the floorboard of the vehicle, a relatively rotatable and axially movable shaft and sleeve means carried by said support means, one of said shaft and sleeve being fixed against rotation and the other against axial movement, a dial housing having graduations thereon, a rotatable lockable dial in said dial housing associated with said graduations, means connecting said dial with said shaft and sleeve means to transmit movement of said dial as it is twirled to said shaft and sleeve means, means amplifying rotation of the dial to provide a relatively large relative axial displacement of said one of said shaft and sleeve fixed against rotation in proportion to the rotation of said dial, said shaft and sleeve being disposed under the accelerator with the said one fixed against rotation extending up into the path of descent thereof to block the depression thereof in accordance with the position of said dial.

References Cited in the file of this patent

UNITED STATES PATENTS

| Number | Name | Date |
| --- | --- | --- |
| 195,650 | Robb | Sept. 25, 1877 |
| 1,325,430 | Willett | Dec. 16, 1919 |
| 1,759,355 | Kampman | May 20, 1930 |
| 2,118,730 | Kalbreier | May 24, 1938 |
| 2,251,087 | Vincent | July 29, 1941 |
| 2,336,447 | Campbell | Dec. 7, 1943 |
| 2,519,859 | Teetor | Aug. 22, 1950 |
| 2,567,529 | Schetzer | Sept. 11, 1951 |
| 2,581,123 | Merkle | Jan. 1, 1952 |